United States Patent [19]
Jorgensen

[11] Patent Number: 5,200,066
[45] Date of Patent: Apr. 6, 1993

[54] OIL SPILL COLLECTING DEVICE WITH VORTEX GENERATOR

[76] Inventor: Adam A. Jorgensen, 1911 NW. 36th St., Oakland Park, Fla. 33309

[21] Appl. No.: 793,172

[22] Filed: Nov. 18, 1991

[51] Int. Cl.$^5$ .............................. E02B 15/04
[52] U.S. Cl. .................... 210/109; 210/242.3; 210/512.1; 210/512.3; 210/923
[58] Field of Search .............. 210/104, 109, 512.1, 210/512.3, 242.3, 923; 405/63, 70, 71

[56] References Cited

U.S. PATENT DOCUMENTS

| | | | |
|---|---|---|---|
| 2,682,151 | 6/1954 | Simpson et al. | 405/70 |
| 3,656,619 | 4/1972 | Ryan et al. | 210/242.3 |
| 3,684,095 | 8/1972 | Ayers | 210/242.3 |
| 3,688,506 | 9/1972 | Marcocchio | 210/242.3 |
| 3,753,492 | 8/1973 | Aiello et al. | 210/242.3 |
| 3,753,496 | 8/1973 | Boyd | 210/242.3 |
| 3,789,988 | 2/1974 | Valibose et al. | 210/242.3 |
| 3,800,951 | 4/1974 | Mourlon et al. | 210/242.3 |
| 3,883,433 | 5/1975 | March et al. | 210/242.3 |
| 3,925,991 | 12/1975 | Poche | 405/71 |
| 4,139,470 | 2/1979 | Stagemeyer et al. | 210/242.3 |
| 4,510,054 | 4/1985 | Wylie | 210/242.3 |
| 4,554,072 | 11/1985 | Ayers | 210/242.3 |
| 4,728,440 | 3/1988 | van Kuijeren | 210/923 |
| 4,867,872 | 9/1989 | Russell et al. | 210/242.3 |
| 4,921,605 | 5/1990 | Chastan-Bagnis et al. | 210/242.3 |
| 4,976,855 | 12/1990 | Virtanen | 210/242.3 |
| 5,022,987 | 6/1991 | Wells | 210/242.3 |

Primary Examiner—Peter Hruskoci
Assistant Examiner—Christopher Upton
Attorney, Agent, or Firm—Oltman and Flynn

[57] ABSTRACT

Oil spill collecting device for collecting an oil layer spilled on a water surface. It has at least a first floating oil collecting arm, a vortex generator disposed at one end of the collecting arm, at least one elongate water inlet with two facing side edges in the vortex generator in fluid communication with a leading side of the collecting arm facing the oil layer. It further has a bottom water outlet, a moving arrangement for creating relative movement between the water surface and the collecting arm for forming a vortex in the vortex generator, and an oil drawing arrangement for drawing oil collected in a pocket forming in the vortex.

13 Claims, 5 Drawing Sheets

OIL SPILL COLLECTING DEVICE WITH VORTEX GENERATOR

The invention relates to an oil spill collecting device for collecting oil spilled on a water surface, and more particularly to an oil spill collecting device having floating oil collecting arms joined by a vortex generator.

BACKGROUND AND PRIOR ART

It is well known that accidental oil spills generate considerable damage to the environment. Inventors have in the past disclosed various arrangements for collecting such oil spills. U.S. Pat. No. 4.554.072 shows an arrangement including a barge downstream of an oil spill connected with floating stationary skimmers that concentrate the oil at the barge from where it can be removed from the water. U.S. Pat. No. 4.976.855 shows an oil-collecting vessel pulling a set of floating screw-like rotating booms which concentrate the oil to a small area from where the oil can be removed.

The known oil spill collecting devices have the disadvantage that the oil is not concentrated in a small space of sufficient thickness so that so that the oil can be effectively pumped out without being intermixed with seawater.

SUMMARY OF THE INVENTION

The invention is based on the knowledge that wherever an eddy, i.e. a vortex is formed in flowing water, floating debris tends to collect at the center of the vortex. It has been found that also oil floating on a water surface will be drawn to the center of the vortex. In other words the gravity gradient in a vortex will tend to draw the lighter oil to the center while the heavier water flows away from the center.

The oil spill collecting device for collecting an oil layer spilled on a water surface has at least a first floating oil collecting arm, a vortex generator disposed at one end of the collecting arm, at least one elongate water inlet with two facing sides in the vortex generator in fluid communication with a leading side of the collecting arm facing the oil layer, a bottom water outlet, moving means for creating relative movement between the water surface and the collecting arm for forming a vortex in the vortex generator, and oil drawing means for drawing oil collected in a pocket forming in the vortex.

The vortex generator has a substantially cylindrical surface tangentially engaging the side of the first collecting arm at one side of the water inlet, and a second floating collecting arm engaging the cylindrical surface at an opposite side of the water inlet, and wherein the first and second collecting arms diverge from each other in direction away from the water inlet.

The oil spill collecting device may further have a second collecting arm having a backside, and a near end terminated proximal to the inlet leaving a part of the inlet in fluid communication with the backside of the second collecting arm, and wherein the first and second collecting arms diverge from each other in direction away from the water inlet.

The collecting arm is advantageously divided into a plurality of floating arm segments, each arm segment terminated at the ends in universal joints for interconnecting the arm segments, with flotation means connected with each of the arm segments. Each of the arm segments has an elongate front face plate having a long and a short dimension, substantially vertically oriented in the short dimension and horizontally oriented in the long dimension, and towline attachment means connected to each arm segment.

The oil spill collecting device advantageously has a barge with a front end adapted for supporting the vortex generator in a substantially vertical position.

The oil collecting device may further include a draw pipe with an oil intake disposed in the oil pocket in the oil drawing means, and an oil pump connected to the draw pipe for pumping oil from the oil intake into the barge.

The oil spill collecting device may further include draw pipe leveling means coupled to the draw pipe for maintaining the oil intake in a position in the pocket substantially level with the center of the pocket, and it may have a servo drive in the leveling means coupled to the draw pipe, and oil-water sensing means coupled to the servo drive for maintaining the oil intake at a fixed position relative to the pocket.

The collecting arm segments may each advantageously have a planar elongate oil barrier having a long dimension substantially equal to the long dimension of the front plate and extending in direction forward of the front plate in a submerged plane substantially parallel with the water surface. Each arm segment may further have at least one towing bracket attached to the arm segment, the bracket being pivotable in a plane substantially parallel with the arm segment.

The oil spill collecting device may further include two fixed arm segments each fixedly attached at one end to the vortex generator and having a pivot joint at the other end for attachment to a respective next arm segment, the fixed arms diverging in direction away from the vortex generator.

The vortex generator may additionally include a bottom plate between the fixed arm segments, which are attached to the lower edges of the fixed arm segments. The vortex generator advantageously also has at least one vane in the water outlet for reducing the rotation of the vortex subtending from the water outlet so as to truncate the descending part of the vortex.

The vortex generator may further have a motor-driven squirrel cage rotor inside the cylindrical surface of the vortex generator.

DESCRIPTION OF THE PREFERRED EMBODIMENT

Figure 1:
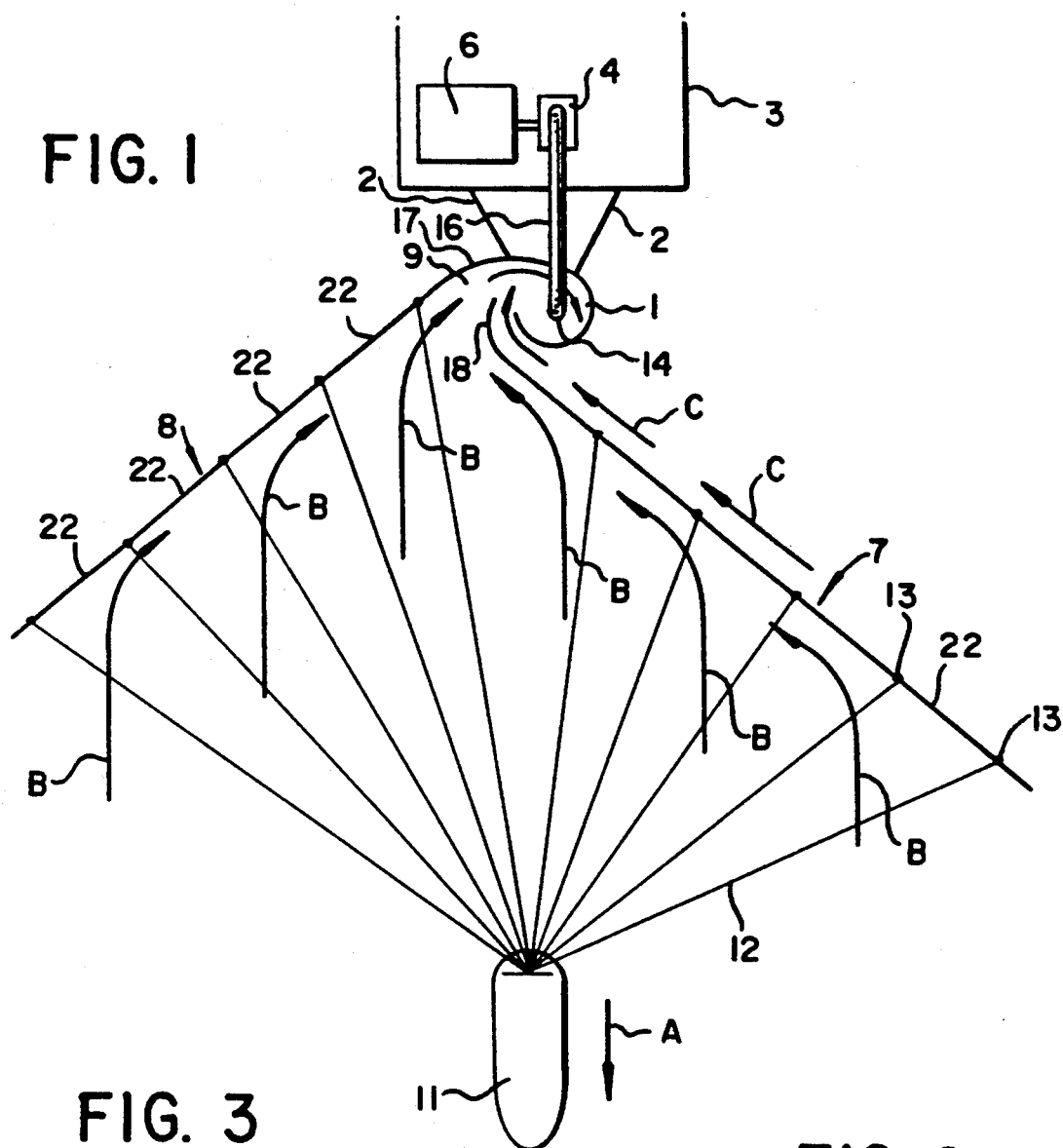
FIG. 1 is a plan diagrammatic view of the invention.

FIG. 1 is a birdseye view of the invention showing the oil collecting device including a vortex generator 1 attached by support arms 2 to a barge 3, which has on it a pump 4 driven by a motor 6. The vortex generator has a vertically oriented cylindrical body with two oil collecting arms 7, 8 connected thereto. The collecting arms 7, 8 are floating partly submerged in the water surface, which has a surface layer of oil floating on top of the surface. The collecting arms are converging on a water inlet 9 with two facing side edges in the vortex generator 1. The entire assembly is towed along the water surface by a towboat 11 connected by tow lines 12 to the stern of the boat, which moves in direction indicated by arrow A.

In operation the oil layer on the surface within the reach of the arms 7, 8 is drawn with the surface water into the water inlet 9, and creates within the vortex generator 1 a swirling vortex. Due to the gravity field created by the rotation in the vortex the heavier water particles are drawn outward toward the walls of the vortex generator, while the lighter oil particles are drawn toward the center of the vortex. The swirling water column in the vortex sinks downward and exits via the bottom water outlet of the vortex generator, while the oil is collected in an oil pocket forming at the top of the water column. The oil is continuously pumped out via a draw pipe 14 connected to the oil pump 4 on the deck of the barge 3, and may from there be discharged into the hold of the barge 3.

Figures 2, 3:
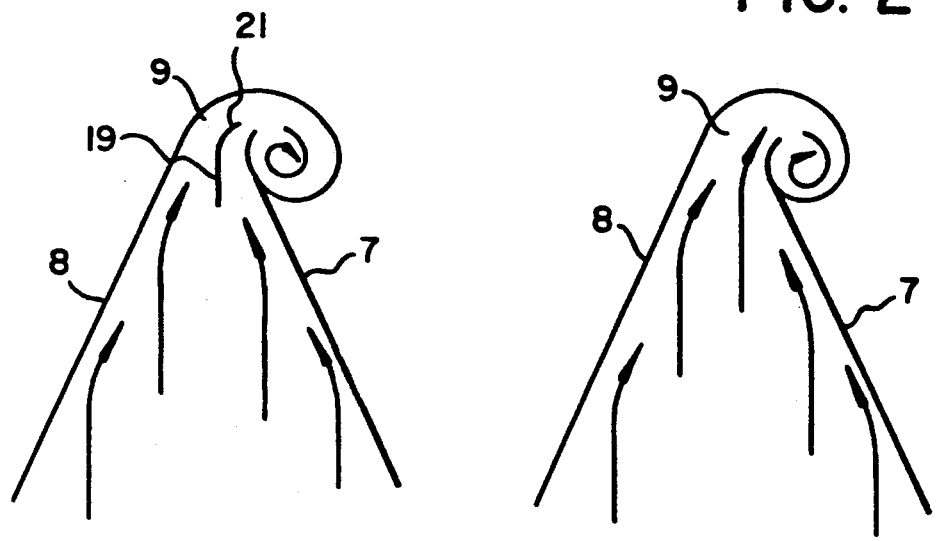
FIG. 2 is a fragmentary diagrammatic view of a detail of the invention showing a version of the vortex generator.
FIG. 3 is a fragmentary diagrammatic view of the invention showing another version of the vortex generator.

The water inlet 9 in the vortex generator can have various forms as shown in FIGS. 1, 2 and 3. In all versions the outer collecting arm 8 terminates at its inner end 17 tangentially with the cylindrical wall of the vortex generator body, while the inner arm 7 in an inner end 18 is curved to follow the direction of the water flow. In the version shown in FIG. 1, the inner end 18 divides the water inlet in a forward part receiving water collecting at the forward facing sides of arms 7 an 8 as indicated by arrows B, and a rear inlet part receiving water drawn by the back side of the inner arm 7, as indicated by arrows C.

In another form of the water inlet, shown in FIG. 2, both collecting arms 7, 8 are terminated tangentially engaging the cylindrical body of the vortex generator 1 but a opposite sides of the water inlet 9.

The water inlet of FIG. 3 is similar to the one of FIG. 2, but is divided by a vertical flow plate 19, curved at its inner end in direction of the water flow, which enhances the formation of a strong vortex. In all cases the formation of the vortex is strengthened by forming the wall of the vortex such that the body of the vortex generator has a diminishing radius in direction of the flow of the water.

Figure 4:
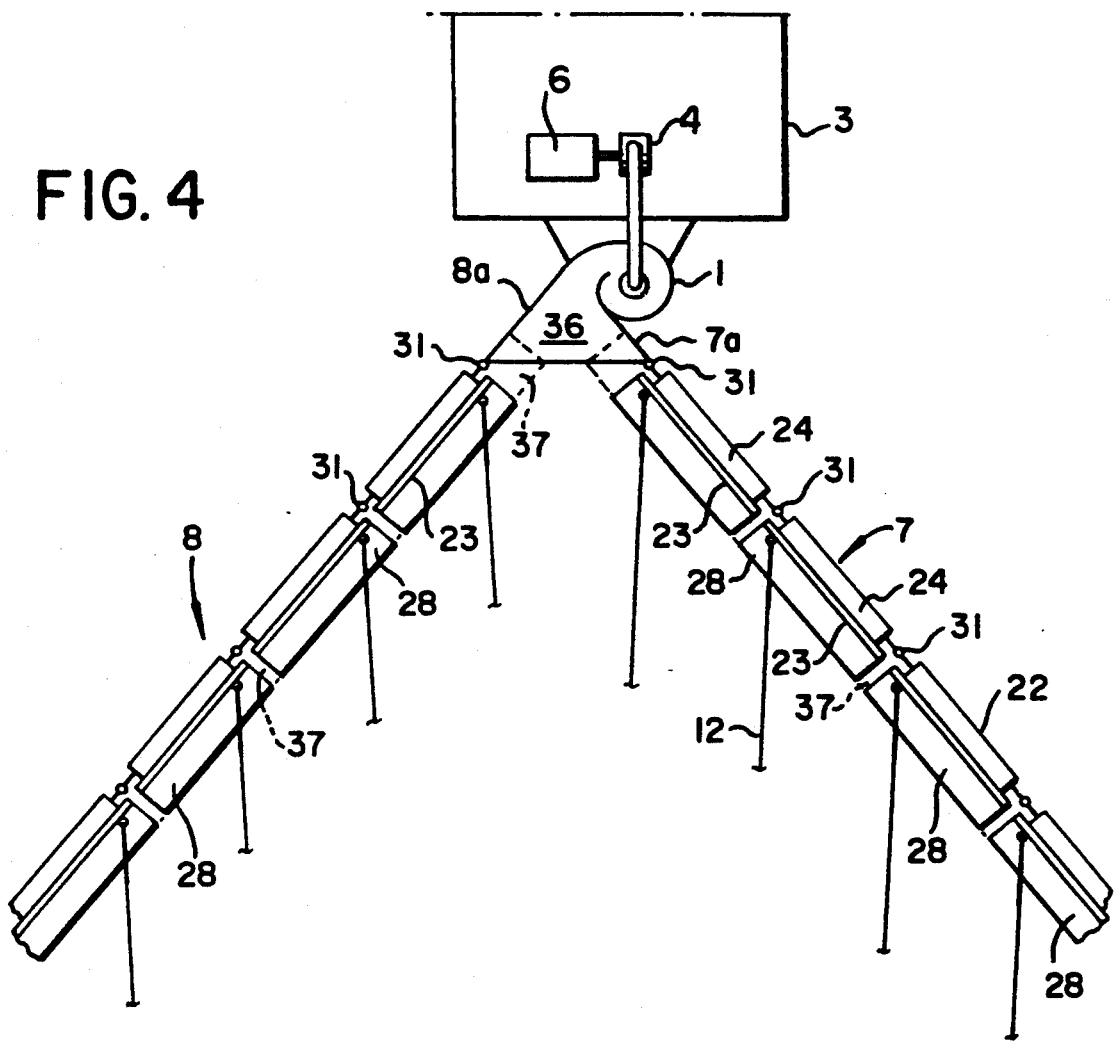
FIG. 4 is a plan view of the invention showing further details of the invention, including segmented oil collection arms.
Figure 5:
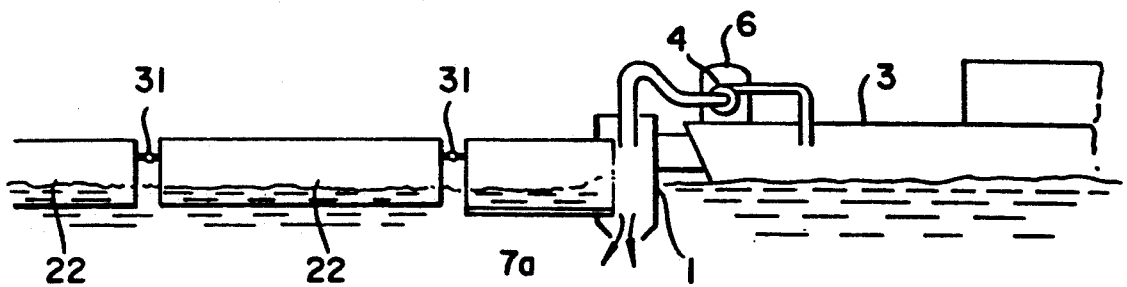
FIG. 5 is an elevational diagrammatic view of the invention showing oil collecting arm segments attached to the vortex generator.
Figure 6:
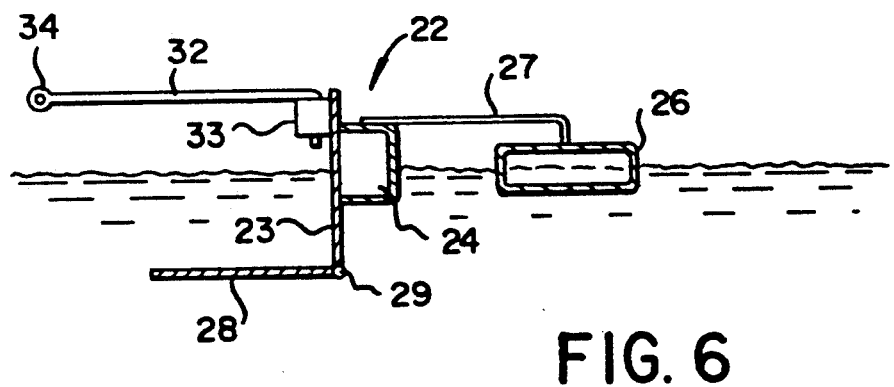
FIG. 6 is an elevational cross-section of a collecting arm segment.
Figure 7:
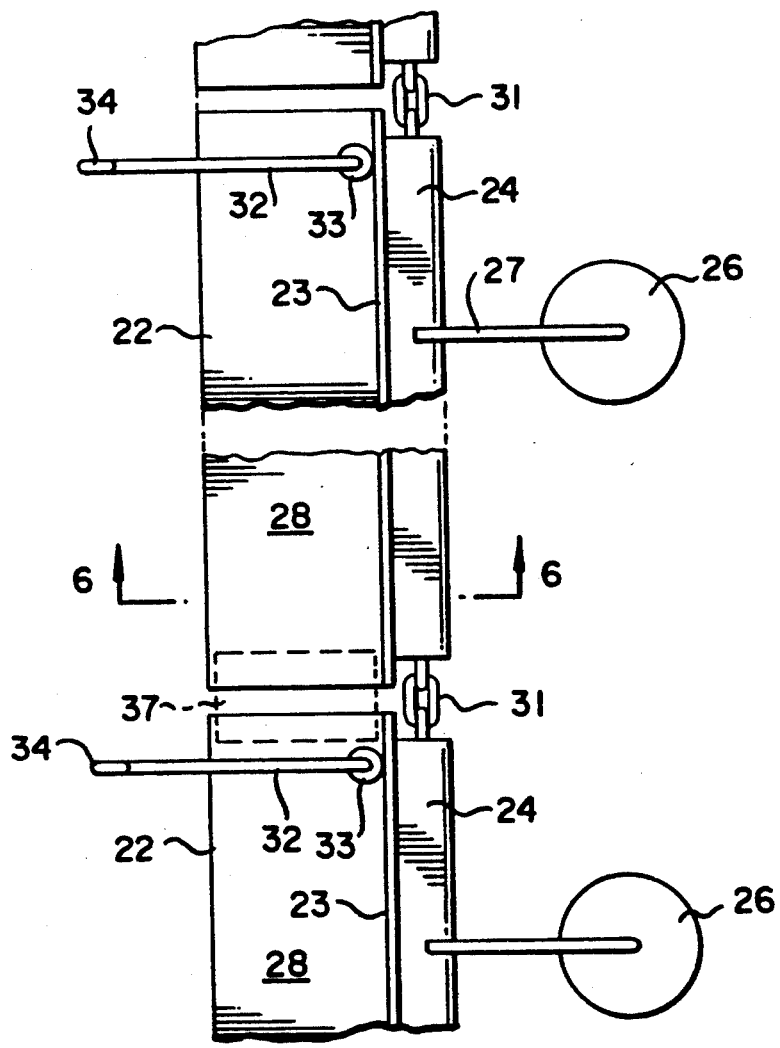
FIG. 7 is plan view of two arm segments and their interconnection.

The collecting arms 7, 8 are advantageously composed of a plurality of connected arm segments 22, as shown in FIGS. 4 and 5. FIG. 6 is a vertical cross-section through an arm segment, seen along the line 6—6 of FIG. 7. Each arm segment 22 has an elongate front plate 23 vertically oriented in its short direction and attached to an elongate flotation chamber 24 attached horizontally to the back side of the front plate 23. One or more outrigger floats 26 is(are) attached by an outrigger arm 27 to each arm segment 22 to maintain it floating with the front plate 23 in vertical direction. A submerged oil spill barrier 28 is attached forward projecting to the lower edge of the front plate 23 to prevent oil particles from escaping downward under the front plate during operation.

The arm segments 22 are joined at their ends by means of universal joints 31 so that the floating arm segments can freely follow waves on the water surface. Each arm segment 22 has a pivotable towing arm 32, pivotable about a pivot element 33 attached to the front plate for attachment of a towline 12 to the arm segment 22, as shown in FIG. 1. By adjusting the length of the individual towlines 12 the crew on the towboat can adjust the entire arm assembly to the most favorable configuration as well as the overall reach of the collecting arms.

The two innermost arm segments 7a and 8a (FIG. 4) are advantageously rigidly attached to the vortex generator 1, and their bottom edges are joined by a bottom plate 36 that is contiguous with the oil barriers 28. The gaps between the oil barriers 28 and the bottom plate 36, as well as between the front plates and the oil barriers can be covered by cover plates 37 shown in phanto lines, to prevent oil and surface water from escaping between the gaps between them, or alternatively the gaps can be prevented by providing overlaps between the oil barriers, the front plates and between the bottom plate and the rigid arm segments and the adjoining oil barriers and front plates.

Figure 8:
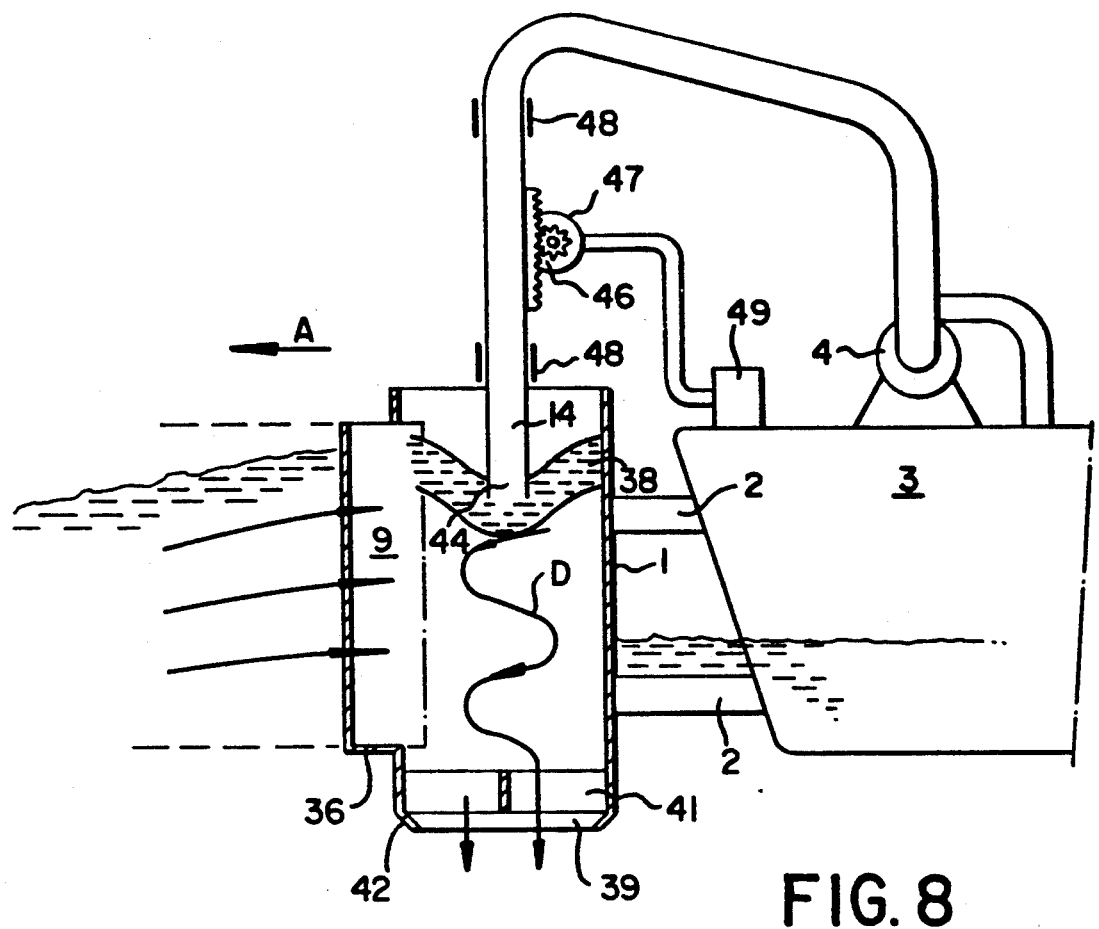
FIG. 8 is an elevational cross-section of a vortex generator in operation seen along the line 8—8 of FIG. 9.
Figure 9:
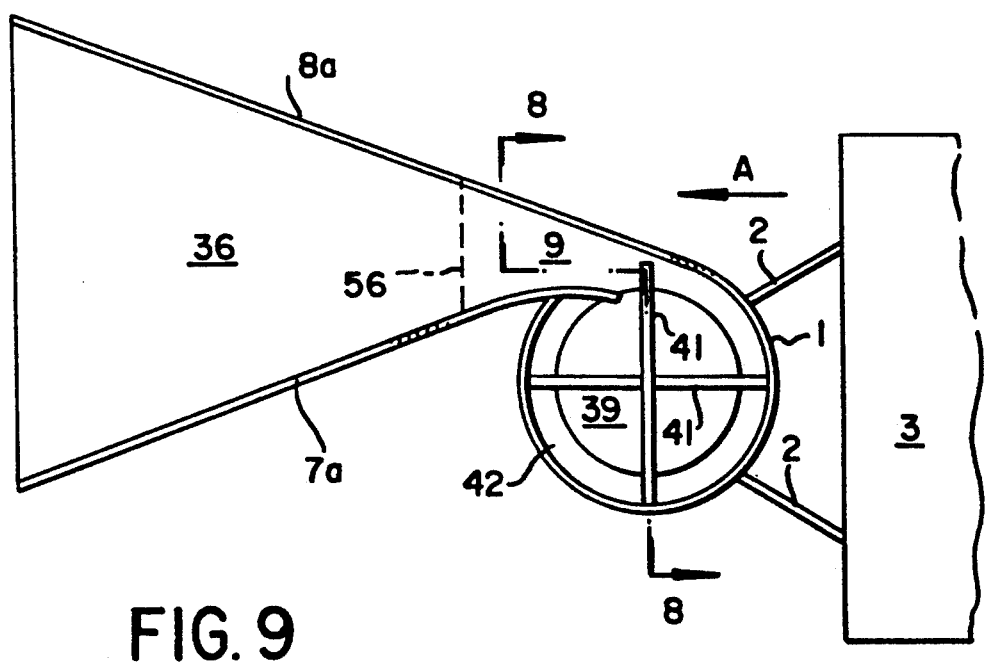
FIG. 9 is a plan view of the vortex generator of FIG. 8.

FIGS. 8 and 9 show in respective elevational and plan views the construction of a vortex generator of the type having only a single water inlet. The direction of movement of the vortex generator relative to the water is indicated by arrow A. Due to the movement and the convergence of the arms the water level rises before the water inlet which provides potential water energy which powers the rotation of the vortex in the vortex generator as indicated by arrow D in FIG. 8. An oil pocket, i.e. an oil layer 38 of a certain thickness many times greater than the thickness of the oil layer before the oil is concentrated in the vortex is collected on top of the water column in the cylindrical body of the vortex generator due to the gravity gradient in the vortex which separates the lighter oil particles from the heavier water particles. The water cleared of its oil descends downward through the bottom water outlet 39 of the vortex generator while the oil is being pumped out through an oil inlet 44 of an oil drawing pipe 14 connected to the oil pump 4. A number of vertically oriented vanes 41 are inserted in the water outlet 39 which stops rotation of the descending water in order to truncate the vortex downward to prevent it from descending beyond the bottom outlet and thereby prevent oil from escaping downward through the bottom outlet. A circular flange 42 in the water outlet 39 helps to reduce the downward velocity of the water flow which gives the oil particles more time to drift inward and upward for more complete oil separation.

It follows that the oil collection device may be stationary if it is located in a moving body of water which moves in opposite direction of arrow A with sufficient speed to form the vortex. This situation could occur in rivers and tidal waters that are to be cleared of an oil spill.

Figures 10, 11:
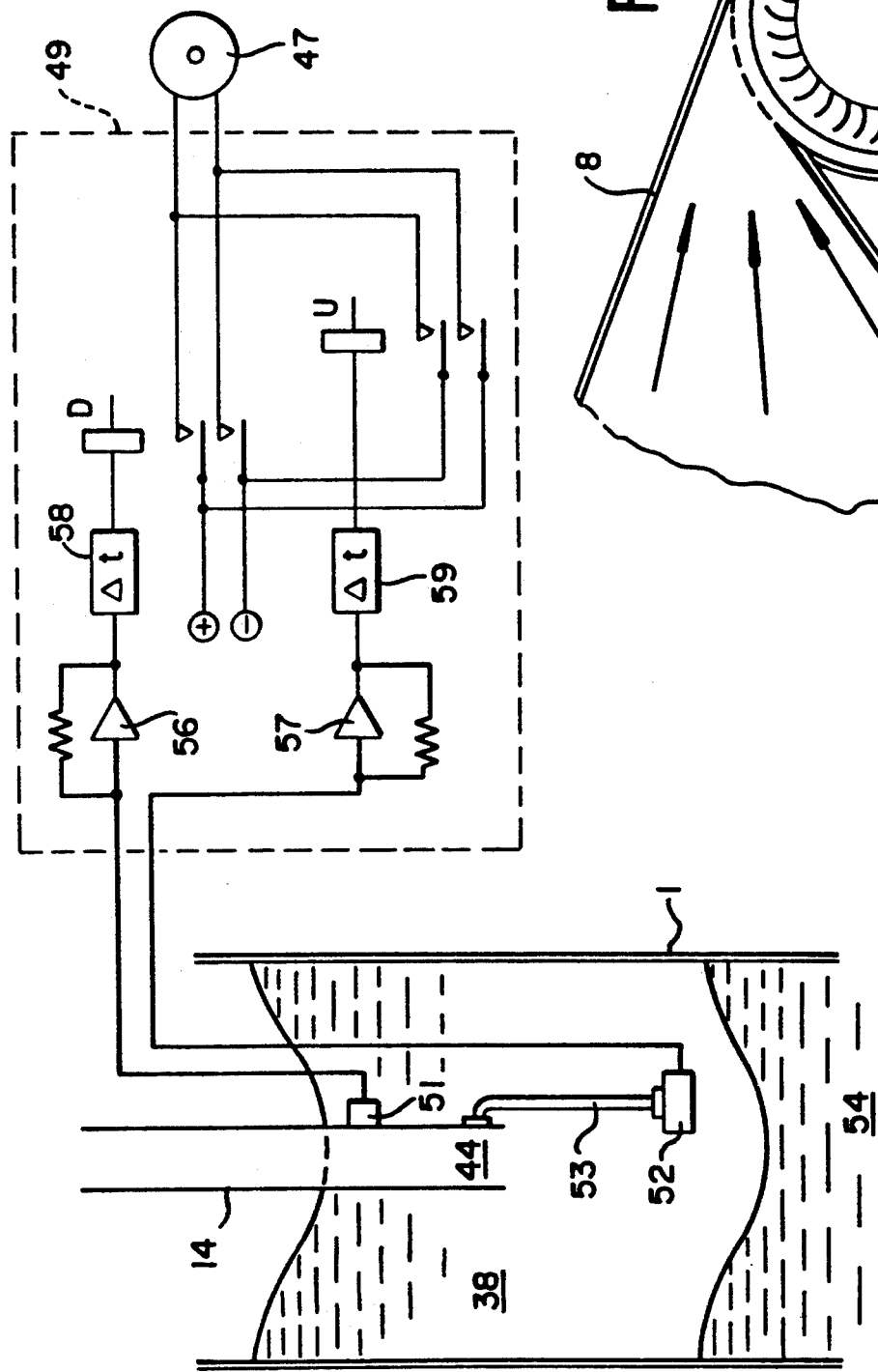
FIG. 10 is an elevational view of the vortex generator with oil draw pipe and level sensors.
FIG. 11 is a plan view of a vortex generator with an augmenting squirrel cage rotor.

In order to keep the oil draw pipe inlet vertically level in the center part of the oil pocket 38 the pipe 14 is connected to a rack and pinion drive 46 driven by a motor 47, which is controlled by servo control circuit 49, shown in more detail in FIGS. 8 and 10. The oil pipe 14 is guided in its vertical movement by two collars 48 that are rigidly attached to the vortex generator 1 by structures not shown for the sake of clarity. The vortex generator is attached to the barge 3 by means of the rigid arms 2. It follows that rigid and sturdy support structures must be provided to support the entire vortex generator 1 with the rigid arms 7a and 8a and the bottom plate 36 to the barge 3, which are not shown in detail since the invention is not directed to the specific details of such structures. As an alternative arrangement, the rigid arm structure with bottom plate 36 can be made vertically pivotable about the dotted line 56 and provided with floats like the arm segments so that it can follow the wave motion of the water surface. Some details of the control circuit are shown in FIG. 10, wherein two sensors 51 and 52 respectively sensing air and water are attached to the draw pipe 14 at equal distances from the water intake 44. Sensor 52 is mounted on an arm 53 pointing downward. The sensing of air and water can for example be performed by sensing the dielectric constant of the medium in which the sensor is immersed. Air has a dielectric constant of 1 and water has a dielectric constant of 78, while oil has a value somewhere there-between depending upon the type of oil. By measuring the capacitance of a capacitor filled by air or oil between the plates in conventional manner the dielectric constant can be determined and thereby a determination can be made as to which fluid, air or water, being sensed. Each sensor is connected to a respective linear amplifier 56, 57, each activating a respective timing circuit 58, 59, each timing circuit activating a respective motor control relay D and U, which respectively operate the motor 49 for a period of time delta t up or down as required to bring the oil intake 44 back to the center of the oil layer if a sensor has sensed respectively air or water, by powering the motor in one direction or the other depending upon the polarity of power being applied to the motor from a power source + and −.

I claim:

1. An oil spill collecting device for collecting an oil layer spilled on a water surface, comprising at least a first floating oil collecting arm having a leading side facing the water surface, a vortex generator disposed at one end of the collecting arm, at least one elongate water inlet with two facing side edges in said vortex generator in fluid communication with the leading side of the collecting arm facing the oil layer, moving means for creating relative movement between said water surface and said collecting arm for forming a vortex in said vortex generator, oil drawing means for drawing oil collecting in an oil pocket forming in said vortex, wherein said vortex generator has a substantially cylindrical surface tangentially engaging said leading side of said first collecting arm at one side edge of said water inlet; a draw pipe having an oil intake disposed in said oil pocket in said oil drawing means, and an oil pump connected to said draw pipe for pumping oil from said oil intake; draw pipe leveling means coupled to said draw pipe for maintaining said oil intake in a position in said oil pocket substantially level with the center of said pocket; and a servo drive in said leveling means coupled to said draw pipe, and oil/water sensing means coupled to said servo drive for maintaining said oil intake at said position substantially level with the center of said pocket.

2. An oil spill collecting device according to claim 1 having a second floating collecting arm engaging said cylindrical surface at an opposite side edge of said water tangentially with said cylindrical surface, and wherein said first and second collecting arms diverge from each other in direction away from said water inlet.

3. An oil spill collecting device according to claim 1 having a second collecting arm having a leading side facing the oil layer, a backside facing away from the oil layer, and a near end terminated proximal to said inlet leaving a part of said inlet in fluid communication with the backside of said collecting ar, and wherein said first and second collecting arms diverge from each other in direction away from said water inlet.

4. An oil spill collecting device according to claim 1 wherein said collecting arm is subdivided into a plurality of floating arm segments, and including a plurality of universal joins for interconnecting said arm segments.

5. An oil spill collecting device according to claim 4 including respective flotation means connected with each of said arm segments.

6. An oil spill collecting device according to claim 4 wherein each of said arm segments has an elongate front face plate having a long and a short dimension, substantially horizontally oriented in the long dimension.

7. An oil spill collecting device according to claim 6 including a planar elongate oil barrier having a long dimension substantially equal to the long dimension of said front plate and extending in direction forward of said front plate in a submerged plane substantially parallel with said water surface.

8. An oil spill collecting device according to claim 4 including towline attachment means connected to each arm segment.

9. An oil spill collecting device according to claim 8, including at least one towing bracket attached to each arm section, said bracket being pivotable in a plane substantially parallel with said arm segment.

10. An oil spill collecting device according to claim 4, including two fixed arm segments each fixedly attached at one end to said vortex generator and having a pivot joint at the other end for attachment to a respective next arm segment, said fixed arms diverging in direction away from said vortex generator.

11. A vortex generator according to claim 10, including a bottom plate between said fixed arm segments, and attached to the lower edges of said fixed arm segments.

12. An oil spill collecting device according to claim 1 including a barge having a front end adapted for supporting said vortex generator in a substantially vertical position.

13. A vortex generator according to claim 1, including a squirrel cage rotor in said vortex generator, and rotating means coupled to said squirrel cage rotor for rotating said rotor.

* * * * *